United States Patent
Kuharenko et al.

(10) Patent No.: US 10,083,347 B2
(45) Date of Patent: Sep. 25, 2018

(54) FACE IDENTIFICATION USING ARTIFICIAL NEURAL NETWORK

(71) Applicant: NTech lab LLC, Moscow (RU)

(72) Inventors: Artem Kuharenko, Moscow (RU);
Sergey Ovcharenko, Moscow (RU);
Alexander Uldin, Moscow (RU)

(73) Assignee: NTech lab LLC, Moscow (RU)

( * ) Notice: Subject to any disclaimer, the term of this patent is extended or adjusted under 35 U.S.C. 154(b) by 0 days.

(21) Appl. No.: 15/224,289

(22) Filed: Jul. 29, 2016

(65) Prior Publication Data

US 2018/0032796 A1  Feb. 1, 2018

(51) Int. Cl.
| | |
|---|---|
| *G06K 9/00* | (2006.01) |
| *G06K 9/62* | (2006.01) |
| *G06K 9/46* | (2006.01) |
| *G06K 9/70* | (2006.01) |
| *G06K 9/66* | (2006.01) |
| *G06T 1/20* | (2006.01) |
| *G06F 17/30* | (2006.01) |

(52) U.S. Cl.
CPC ... *G06K 9/00288* (2013.01); *G06F 17/30256* (2013.01); *G06F 17/30289* (2013.01); *G06K 9/00268* (2013.01); *G06K 9/6215* (2013.01); *G06K 9/6256* (2013.01); *G06K 9/66* (2013.01); *G06T 1/20* (2013.01); *G06T 2200/28* (2013.01)

(58) Field of Classification Search
USPC ................................ 382/118, 156, 201, 207
See application file for complete search history.

(56) References Cited

U.S. PATENT DOCUMENTS

| | | | |
|---|---|---|---|
| 6,463,163 B1 | 10/2002 | Kresch | |
| 7,050,607 B2 | 5/2006 | Li et al. | |
| 7,203,346 B2 | 4/2007 | Kim | |
| 7,236,615 B2 | 6/2007 | Miller et al. | |
| 7,295,687 B2 | 11/2007 | Kee et al. | |
| 7,689,011 B2 | 3/2010 | Luo et al. | |
| 8,442,927 B2 | 5/2013 | Chakradhar et al. | |
| 9,552,549 B1* | 1/2017 | Gong | G06N 3/084 |
| 2007/0242856 A1 | 10/2007 | Suzuki et al. | |
| 2015/0261702 A1* | 9/2015 | Culurciello | G06F 13/28 |
| | | | 710/308 |
| 2015/0310263 A1* | 10/2015 | Zhang | G06K 9/00315 |
| | | | 382/103 |

(Continued)

FOREIGN PATENT DOCUMENTS

CN          104346607 A       11/2014

OTHER PUBLICATIONS

"RU2017000687 Search Report 20180118", w/English Abstract, (dated Jan. 18, 2018), 8 pages.

(Continued)

*Primary Examiner* — Kathleen Y Dulaney
(74) *Attorney, Agent, or Firm* — Schwegman Lundberg & Woessner, P.A.

(57) ABSTRACT

Automated facial recognition is performed by operation of a convolutional neural network including groups of layers in which the first, second, and third groups include a convolution layer, a max-pooling layer, and a parametric rectified linear unit activation function layer. A fourth group of layers includes a convolution layer and a parametric rectified linear unit activation function layer.

17 Claims, 8 Drawing Sheets

(56) References Cited

U.S. PATENT DOCUMENTS

| | | | | |
|---|---|---|---|---|
| 2015/0331832 A1* | 11/2015 | Minoya | ............... | G06F 17/10 706/16 |
| 2015/0347820 A1 | 12/2015 | Yin et al. | | |
| 2017/0032285 A1* | 2/2017 | Sharma | ............... | G06N 3/08 |
| 2017/0140260 A1* | 5/2017 | Manning | ............... | G06N 3/04 |

OTHER PUBLICATIONS

Fasel, Beat, "Multiscale Facial Expression Recognition using Convolutional Neural Networks", Indian Conference on Computer Vision, Graphics and Image Processing (ICVGIP 02), (2002), 6 pages.

Garcia, Christophe, et al., "Convolutional Face Finder: A Neural Architecture for Fast and Robust Face Detection", IEEE Transactions on Pattern Analysis and Machine Intelligence, vol. 26, No. 11, (Nov. 2004), pp. 1408-1423.

Giusti, Alessandro, et al., "Fast Image Scanning with Deep Max-Pooling Convolutional Neural Networks", arXiv:1302.1700v1, (Feb. 8, 2013), 11 pages.

Goodfellow, Ian, et al., "Deep Learning", The MIT Press, 2016, vol. 1, ISBN 978-0-262-03561-3, (2016), 63 pages.

Gu, Jiuxiang, et al., "Recent Advances in Convolutional Neural Networks", 2015arXiv151207108G, (Dec. 2015), 14 pages.

Guo, Guodong, et al., "Face Recognition by Support Vector Machines", School of Electrical and Electronic Engineering Nanyang Technological University, Singapore 639798, (Mar. 28, 2000), 6 pages.

Hinton, G. E., et al., "Improving neural networks by preventing co-adaptation of feature detectors", arXiv:1207.0580v1, (Jul. 3, 2012), 18 pages.

Krizhevsky, Alex, et al., "ImageNet Classification with Deep Convolutional Neural Networks", Advances in Neural Information Processing Systems 25 (NIPS 2012), (2012), 9 pages.

Lin, Min, et al., "Networks in Networks", arXiv:1312.4400v3, (Mar. 4, 2014), 10 pages.

Matsugu, Masakazu, et al., "Subject independent facial expression recognition with face detection using a convolutional neural network", Canon Research Center, 5-1, Morinosato-Wakamiya, Atsugi 243-0193, (2003), pp. 555-559.

Ouyang, Wanli, et al., "DeepID-Net: multi-stage and deformable deep convolutional neural networks for object detection", arXiv:1409.3505v1, (Sep. 11, 2014), 13 pages.

Sun, Yi, et al., "Deep Learning Face Representation from Predicting 10,000 Classes", Proceedings of the 2014 IEEE Conference on Computer Vision and Pattern Recognition, (Jun. 2014), 8 pages.

Wu, Xiang, "Learning Robust Deep Face Representation", arXiv:1507.04844v1, (Jul. 17, 2015), 5 pages.

Yu, Dingjun, et al., "Mixed Pooling for Convolutional Neural Networks", DOI: 10.1007/978-3-319-11740-9_34 Springer International Publishing Switzerland, (2014), pp. 364-375.

Yu, Dingjun, et al., "Mixed Pooling for Convolutional Neural Networks", Rough Sets and Knowledge Technology. RSKT 2014. Lecture Notes in Computer Science, vol. 8818. Springer, Cham, (2014), pp. 364-375.

Zeiler, Matthew D., et al., "Stochastic Pooling for Regularization of Deep Convolutional Neural Networks", Proceedings of the International Conference on Learning Representation (ICLR), (Jan. 16, 2013), 9 pages.

Zeiler, Matthew D., et al., "Visualizing and Understanding Convolutional Networks", Computer Vision—ECCV 2014. ECCV 2014. Lecture Notes in Computer Science, vol. 8689. Springer, Cham, (2014), 11 pages.

* cited by examiner

FACE IDENTIFICATION USING ARTIFICIAL NEURAL NETWORK

TECHNICAL FIELD

Embodiments described herein generally relate to information processing and, more particularly, to machine-vision and machine-learning systems and associated methodology with applications including facial recognition.

BACKGROUND

Facial recognition systems are finding increasing use in a wide variety of applications, from law enforcement, security or access control, to organizing photographs or videos, to online dating services, among myriad other applications. Facial recognition differs from facial detection in that the latter aims to simply detect the presence of a face in an image or video frame, whereas the former aims to recognize a unique individual in an image or video frame from among a potentially large set of identified individuals.

A number of different computational methods have been employed, including nearest-neighbor classifiers, support vector machines, and artificial neural networks (ANNs), among many others. Of the various approaches, convolutional ANNs have demonstrated particularly good performance for this task.

Convolutional ANNs (hereinafter, CNNs) have a trainable architecture that can learn invariant features for a number of applications. In general, CNNs contain alternating convolutional layers, non-linearity layers and feature pooling layers. Each layer is composed of elements, or "neurons," that have learnable weights and biases. When used for image recognition in particular, CNNs are with multiple layers of small neuron collections process portions of the input image. The outputs of these collections are then tiled so that their input regions overlap, thereby obtaining a better representation of the original image.

In operation, CNNs extract local features of each image at a high resolution and successively combine them into more complex features at lower resolutions. The loss of spatial information is compensated by an increasing number of feature maps in the higher layers.

The convolutional layer computes an inner product of the linear filter and the underlying receptive field followed by a nonlinear activation function at every local portion of the input. Then, the non-linear transformation layer performs normalization among nearby feature maps. The feature-pooling layer combines local neighborhoods using an average or maximum operation, aiming to achieve invariance to small distortions.

An ongoing challenge for designers of facial recognition systems is achieving high accuracy performance on the one hand, and computational efficiency, (e.g., processing speed) on the other. However, these are generally countervailing performance attributes of CNN-based facial recognition systems. A practical solution is needed to further advance both of these performance attributes.

SUMMARY OF THE DISCLOSURE

One aspect of the present disclosure is directed to facial recognition performed by operation of a convolutional neural network including groups of layers in which the first, second, and third groups include a convolution layer, a max-pooling layer, and a parametric rectified linear unit activation function layer. A fourth group of layers includes a convolution layer and a parametric rectified linear unit activation function layer.

In a related aspect, a system for performing automated facial recognition. The system includes execution hardware including at least one processor core, a data store, and input/output facilities. The execution hardware is configured to implement a convolutional neural network having at least four groups of layers.

The first group of layers is configured to accept as its input an image containing a face. The image has a plurality of input channels and a certain input pixel quantity. The first group includes a first convolution layer, a first max-pooling layer, and a first parametric rectified linear unit activation function. The first group is configured to produce an output having a first predefined quantity of channels that is greater than the plurality of input channels by a factor of at least 80, and a pixel quantity that is more than 4.2 times smaller than the input pixel quantity;

The second group of layers is configured to accept as its input the output of the first group of layers. The second group includes a second convolution layer, a second max-pooling layer, and a second parametric rectified linear unit activation function. The second group is configured to produce an output having a second predefined quantity of channels that is greater than the first predefined quantity of channels by a factor of at least 3, and a pixel quantity that is more than 4.2 times smaller than the pixel quantity of the output of the first group of layers.

The third group of layers is configured to accept as its input the output of the second group of layers. The third group includes a third convolution layer, a third max-pooling layer, and a third parametric rectified linear unit activation function. The third group is configured to produce an output having a third predefined quantity of channels that is greater than the second predefined quantity of channels by a factor of at least 2, and a pixel quantity that is more than 3.5 times smaller than the pixel quantity of the output of the second group of layers.

The fourth group of layers is configured to accept as its input the output of the third group of layers. The fourth group includes a fourth convolution layer, and a fourth parametric rectified linear unit activation function. The fourth group is configured to produce an output having a fourth predefined quantity of channels that is greater than the third predefined quantity of channels by a factor of at least 2, and a pixel quantity that is more than 1.1 times smaller than the pixel quantity of the output of the third group.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the invention are directed to automated facial recognition utilizing convolutional neural networks for building a database of "known" reference faces, against which a subject face may be compared to achieve recognition of the subject face if that face is known as a reference face. Notably, the subject face may be characterized from a different source image than the source image from which the reference face was characterized. As will be described in greater detail below, a training set building system is used to create feature vectors for each of the reference faces, which may be indexed, or otherwise stored, in a database or other searchable data structure. A face recognizer system is used to generate a feature vector for the subject face and execute a query to find the subject face among the reference faces.

The source images may be from any suitable source, such as data captured by an image sensor, data representing a topographic scan of a subject, data from a frame of a motion video, data from a preexisting image file produced by a scan of a printed image of a subject, etc.

Some embodiments may be implemented as part of a special-purpose computer system. The computer system may be one physical machine, or may be distributed among multiple physical machines, such as by role or function, or by process thread in the case of a cloud computing distributed model. In various embodiments, aspects of the invention may be configured to run in virtual machines that in turn are executed on one or more physical machines. It will be understood by persons of skill in the art that features of the invention may be realized by a variety of different suitable machine implementations.

Figure 1A:
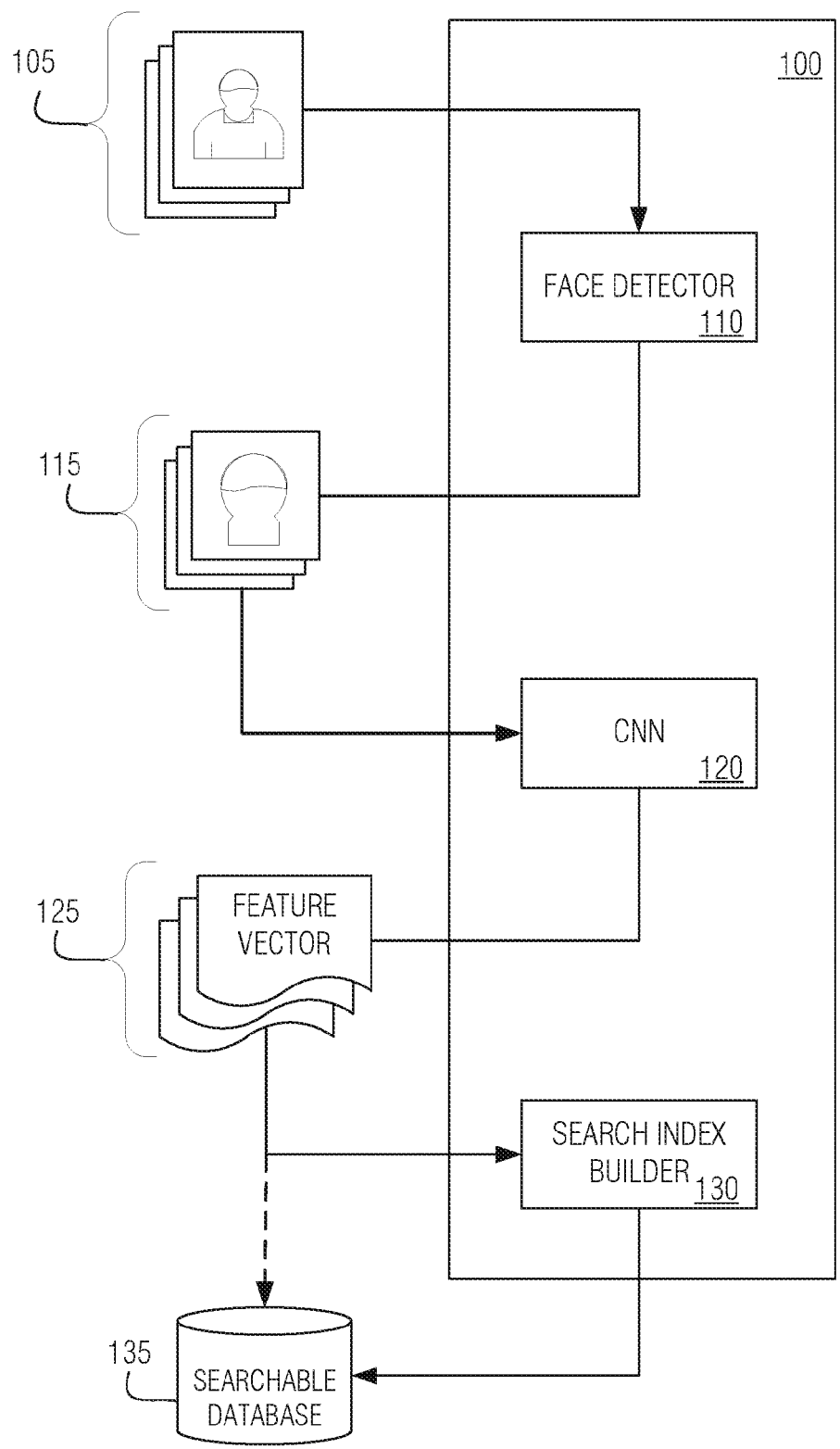
FIG. 1A is a block diagram illustrating a high-level system architecture for a training set building system that builds a searchable database of reference face feature vectors according to certain embodiments.

FIG. 1A is a block diagram illustrating a high-level system architecture for a training set building system 100 that builds a searchable database of reference face feature vectors according to certain embodiments. A feature vector is an n-dimensional vector of numerical values that represent various parameters of an object which, in the present context, is a reference face or a subject face. In an example embodiment, as depicted, training apparatus includes face detector 110, convolutional neural network 120, and search index builder 130.

Face detector 110 is programmed, or otherwise configured, to analyze visual features from each of a plurality of reference images 105, to detect one or more faces in that image. The output from face detector 110 is a set of uniformly-sized facial images 115 of individual faces. Facial images 115 may be created by cropping, resizing, format-converting, or some combination thereof, of reference images 105. There may or may not be a 1:1 relationship between reference images 105 and facial images 115, as may be the case, for instance, where a reference image 105 contains more than one person's face, or where face detector 110 fails to detect any face in a given reference image 105. In an example embodiment, facial images 115 are each an image of 80×80 pixels represented in three channels (e.g., red, green, and blue).

Each of facial images 115 is fed to CNN 120, which is described in greater detail below. As an overview, CNN 120 processes each of facial images 115 to produce a corresponding feature vector of feature vector set 125. Feature vector set 125 may be stored in searchable database 135, which in this example is representative of any suitable searchable data structure.

In a related embodiment, search index builder 130 is programmed, or otherwise configured, to read each of the feature vectors of feature vector set 125 and build a search index. In one example, search index builder 130 computes a hash, or digest, of each feature vector, and stores the set of hashes in a fast-retrieval index. In another embodiment, search index builder 130 generates a binary search tree of feature vectors 125 or their respective hashes.

Figure 1B:
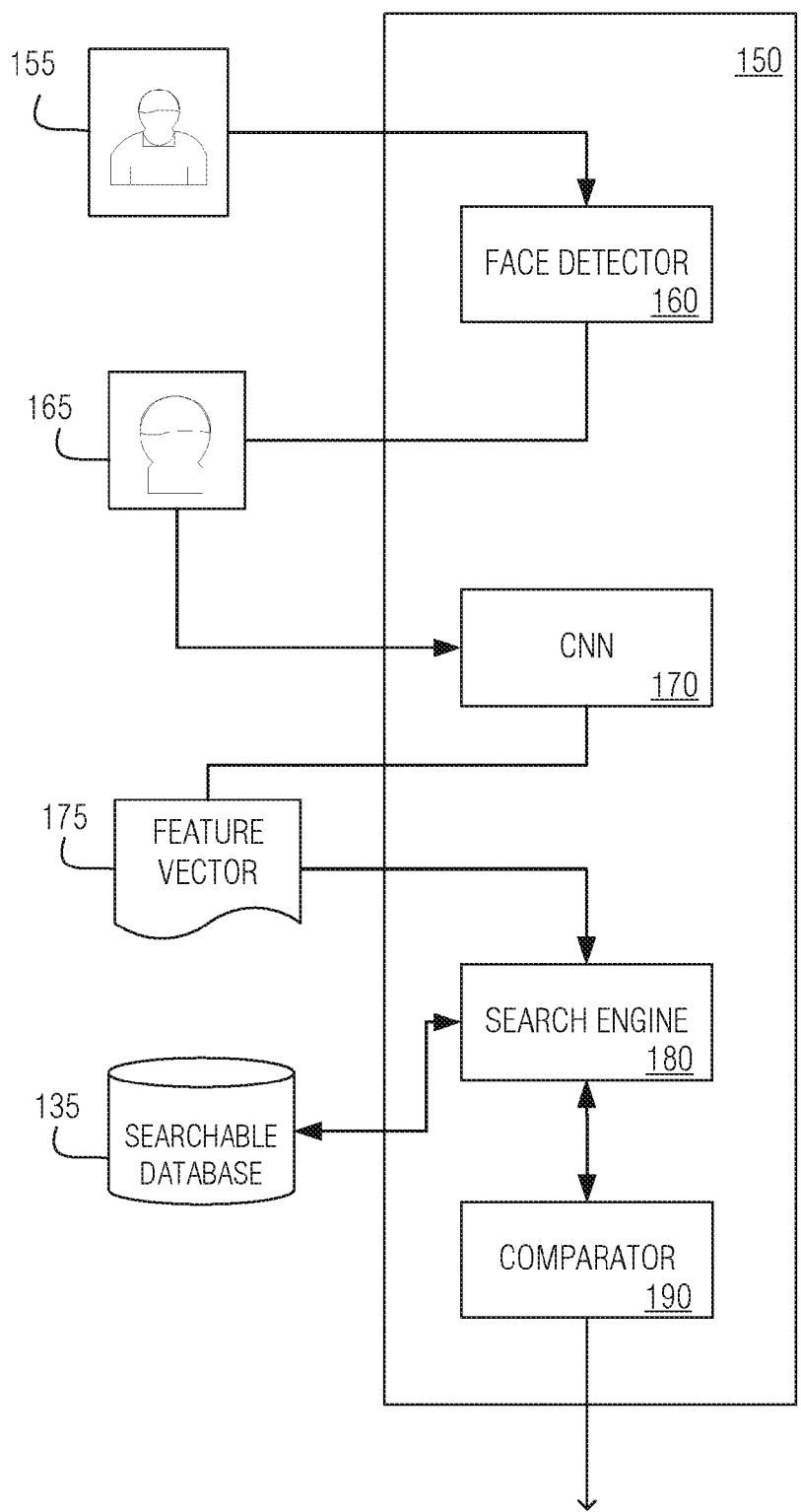
FIG. 1B is a high-level block diagram of a face recognizer system according to an embodiment.

FIG. 1B is a high-level block diagram of a face recognizer system 150 according to an embodiment. System 150 includes face detector 160, convolutional network 170, search engine 180, and comparator 190. Face detector 160 is similar to face detector 110, except that in operation face detector 160 processes reference image 155, to produce subject facial image 165. Subject facial image 165 is produced to be uniform with facial images 115 in terms of size and format.

Subject facial image 165 is passed to CNN 170, which is programmed, or otherwise configured, to produce a subject feature vector 175 corresponding to subject facial image 165. Subject feature vector 175 is fed to search engine 180, which forms a suitable search query in searchable database 135 for one or more feature vectors from among the set of feature vectors 125 that match subject feature vector 175, or are similar to subject feature vector 175. In one example, if an identical match is not found, the query returns some predefined quantity k of most similar feature vectors most similar to the subject feature vector, where k may be any positive integer value less than the number of feature vectors in database 135, but typically k will be a small integer value. For instance, k may be 1, 2, 3 etc.

Comparator 190 is programmed, or otherwise configured, to produce a measure of similarity of each of the feature vectors returned in response to the query, and to compare that measure of similarity to a predefined similarity threshold. In an example embodiment, the measure of similarity is a Euclidian distance measurement, though other similarity measures may be used in various other embodiments. For instance, certain features of the feature vectors may have a weighting applied to increase or decrease its impact on the similarity computation. In a related embodiment, the threshold is dynamically set to be met only by the k nearest feature vectors from the database 135. This may be implemented, for instance, in the case of Euclidian distance being used as the similarity measure, by setting the distance threshold to be just lower than the (k+1)-th distance value. The output from comparator 190 may be a TRUE/FALSE indication of the similarity criteria having been met or not met.

The accuracy of the facial recognition system relies on the quality of the feature vectors being sufficient to distinguish the subject's face from all others. Stated another way, the feature vectors should be such that the distance between feature vector $v_i$ for a given subject and feature vector $v_j$ of the same subject is less than the distance between $v_i$ and feature vector $v_k$ corresponding to any other individual different from the subject.

In one example embodiment, system 100 and system 150 are implemented on a common computing platform. In another example embodiment, systems 100 and 150 are respectively realized with distinct computing platforms. In a related embodiment, training set building system 100 and face recognizer system 150 respectively operate independently from one another. For instance, system 100 may modify searchable database 135 by adding or removing feature vectors, for example, while face recognizer system 100 conducts search operations in searchable database 135.

In various embodiments, the components of systems 100 and 150 are implemented as engines, circuits, components, or modules, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

Figure 2:
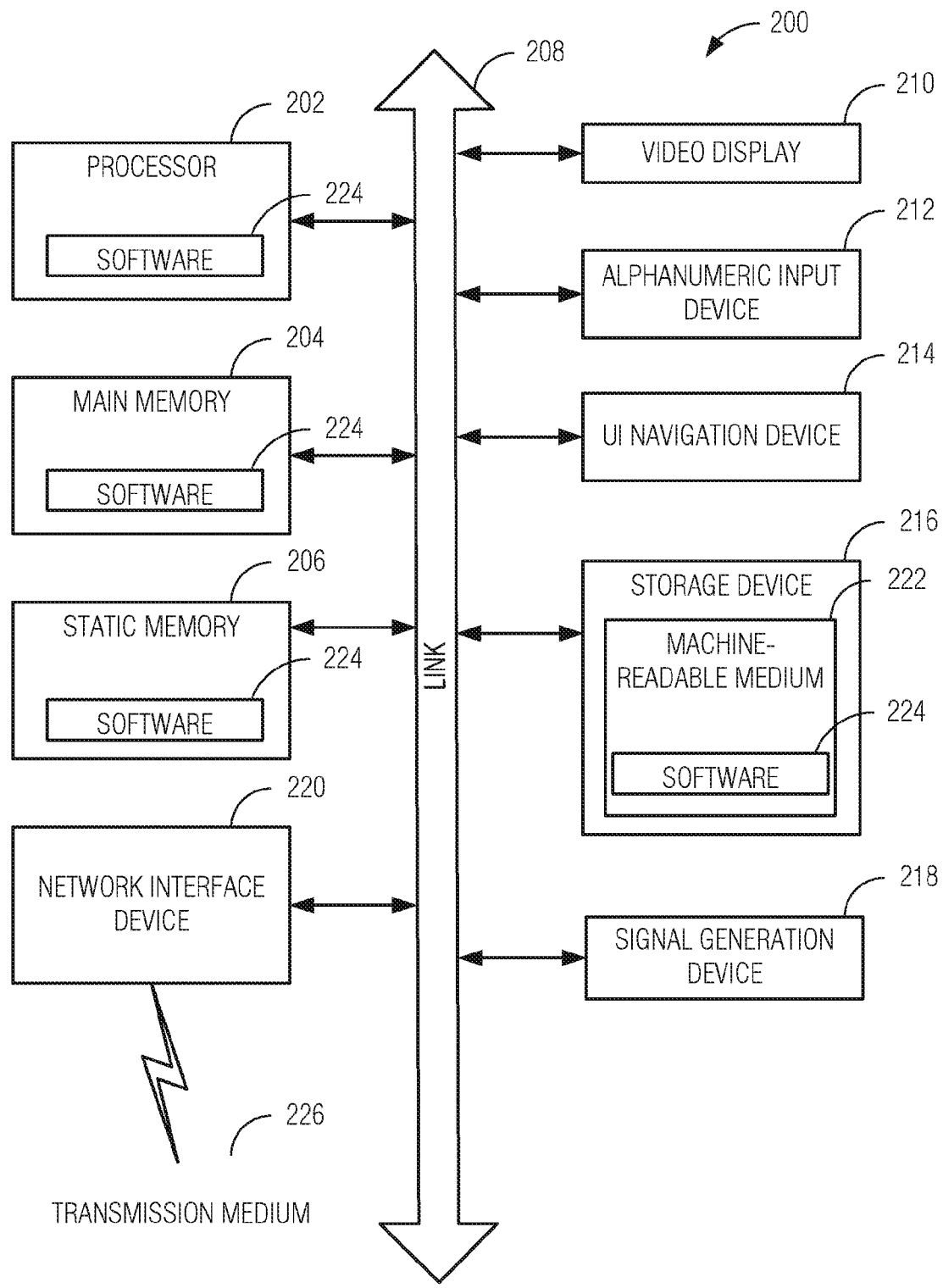
FIG. 2 is a block diagram illustrating an exemplary system architecture of a processor-based computing device according to an embodiment.

FIG. 2 is a block diagram illustrating a computer system in the example form of a general-purpose machine, which may be configured by software or firmware instructions into a special-purpose machine for carrying out facial recognition operations according to some embodiments. In certain embodiments, programming of the computer system 200 according to one or more particular algorithms produces the special-purpose machine upon execution of that programming. In a networked deployment, the computer system 200 may operate in the capacity of either a server or a client machine in server-client network environments, or it may act as a peer machine in peer-to-peer (or distributed) network environments. Computer system 200 represents an example architecture in which systems 100 or 150 may be implemented.

Example computer system 200 includes at least one processor 20:2 (e.g., a central processing unit (CPU), a graphics processing unit (GPU) or both, processor cores, compute nodes, etc.), a main memory 204 and a static memory 206, which communicate with each other via a link 208 (e.g., bus). The computer system 200 may further include a video display unit 210, an alphanumeric input device 212 (e.g., a keyboard), and a user interface (UI) navigation device 214 (e.g., a mouse). In one embodiment, the video display unit 210, input device 212 and UI navigation device 214 are incorporated into a touch screen display. The computer system 200 may additionally include a storage device 216 (e.g., a drive unit), a signal generation device 218 (e.g., a speaker), a network interface device (MD) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computer system 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
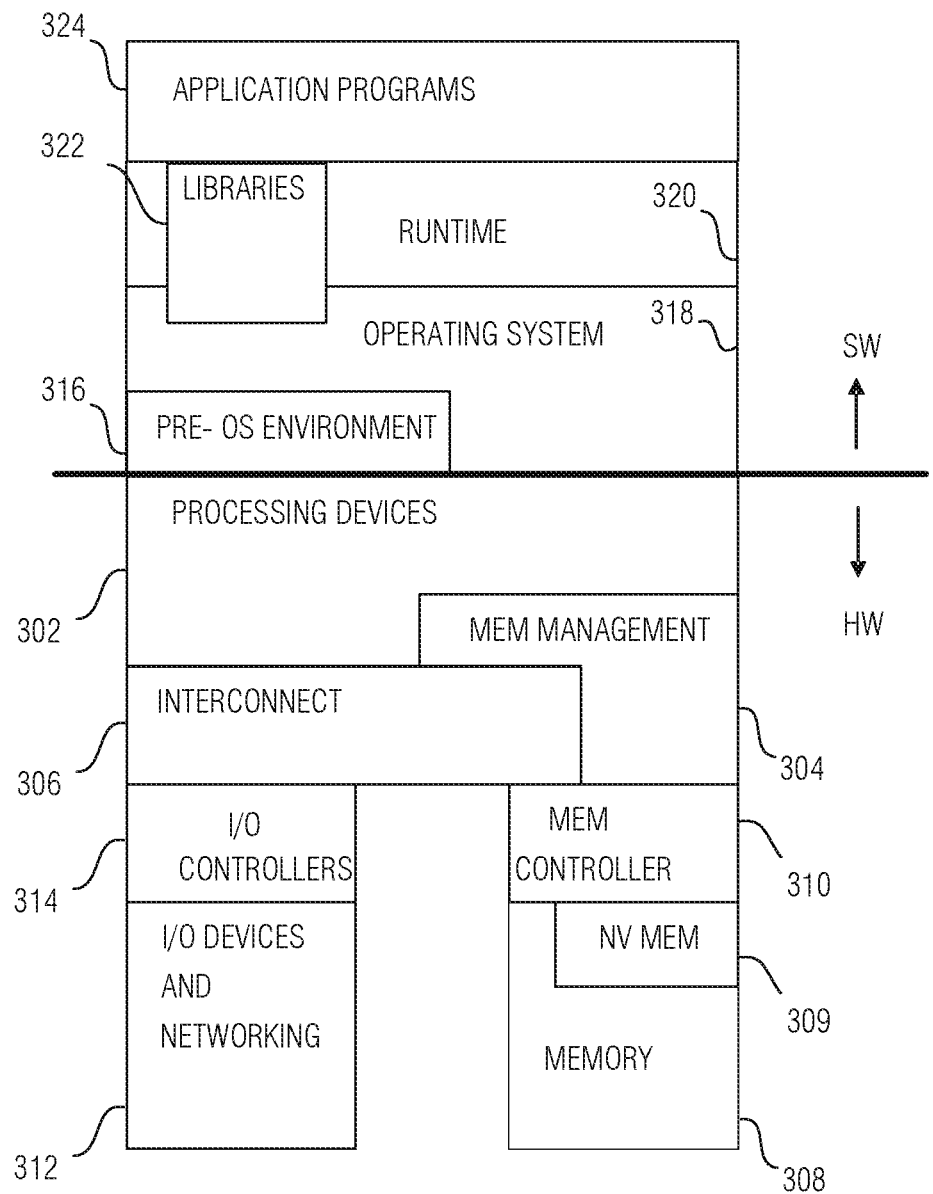
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors, Run-time system 320 may also perform support services such as type checking, debugging, or code generation and optimization.

Libraries 322 include collections of program functions that provide further abstraction for application programs. These include shared libraries, dynamic linked libraries (DLLs), for example, Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 4:
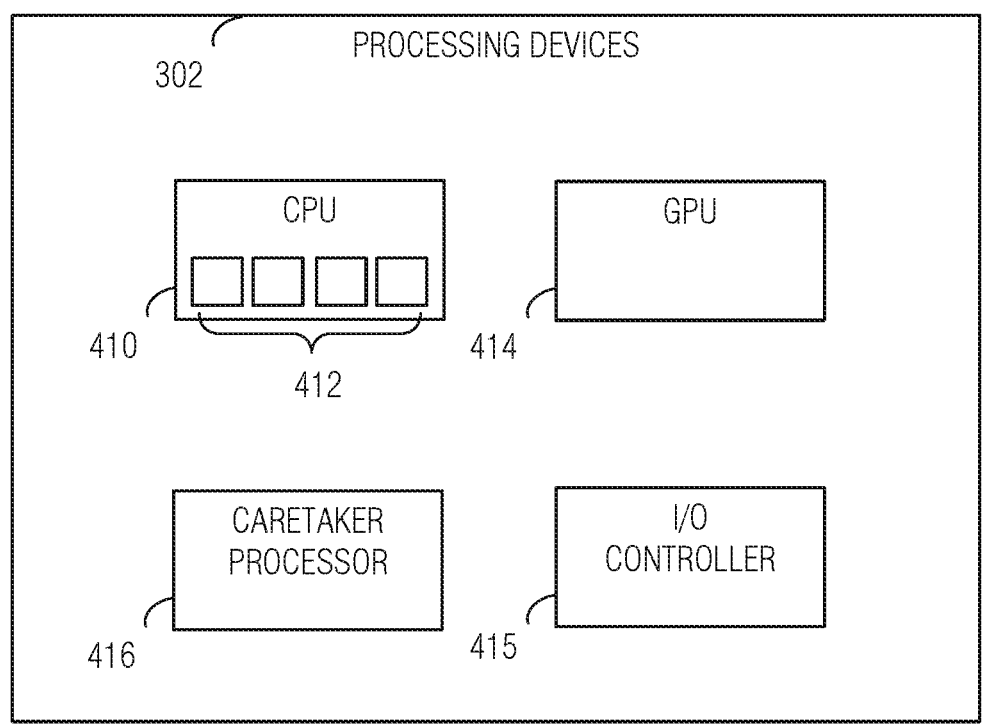
FIG. 4 is a block diagram illustrating examples of processing devices that may be implemented on a computer system, such as the computer system described with reference to FIGS. 2-3, according to some embodiments.

FIG. 4 is a block diagram illustrating processing devices 302 according to some embodiments. One, or a combination, of these devices may constitute processor 120 in some embodiments. CPU 410 may contain one or more processing cores 412, each of which has one or more arithmetic logic units (ALU), instruction fetch unit, instruction decode unit, control unit, registers, data stack pointer, program counter, and other essential components according to the particular architecture of the processor. As an illustrative example, CPU 410 may be a x86-type of processor. Processing devices 302 may also include a graphics processing unit (GPU) 414. In these embodiments, GPU 414 may be a specialized co-processor that offloads certain computationally-intensive operations, particularly those associated with graphics rendering, from CPU 410. Notably, CPU 410 and GPU 414 generally work collaboratively, sharing access to memory resources, I/O channels, etc.

Processing devices 302 may also include caretaker processor 416 in some embodiments. Caretaker processor 416 generally does not participate in the processing work to carry out software code as CPU 410 and GPU 414 do. In some embodiments, caretaker processor 416 does not share memory space with CPU 410 and GPU 414, and is therefore not arranged to execute operating system or application programs. Instead, caretaker processor 416 may execute dedicated firmware that supports the technical workings of CPU 410, GPU 414, and other components of the computer system. In some embodiments, caretaker processor is implemented as a microcontroller device, which may be physically present on the same integrated circuit die as CPU 410, or may be present on a distinct integrated circuit die. Caretaker processor 416 may also include a dedicated set of I/O facilities to enable it to communicate with external entities. In one type of embodiment, caretaker processor 416 is implemented using a manageability engine (ME) or platform security processor (PSP). Input/output (I/O) controller 415 coordinates information flow between the various processing devices 410, 414, 416, as well as with external circuitry, such as a system interconnect.

Figure 5:
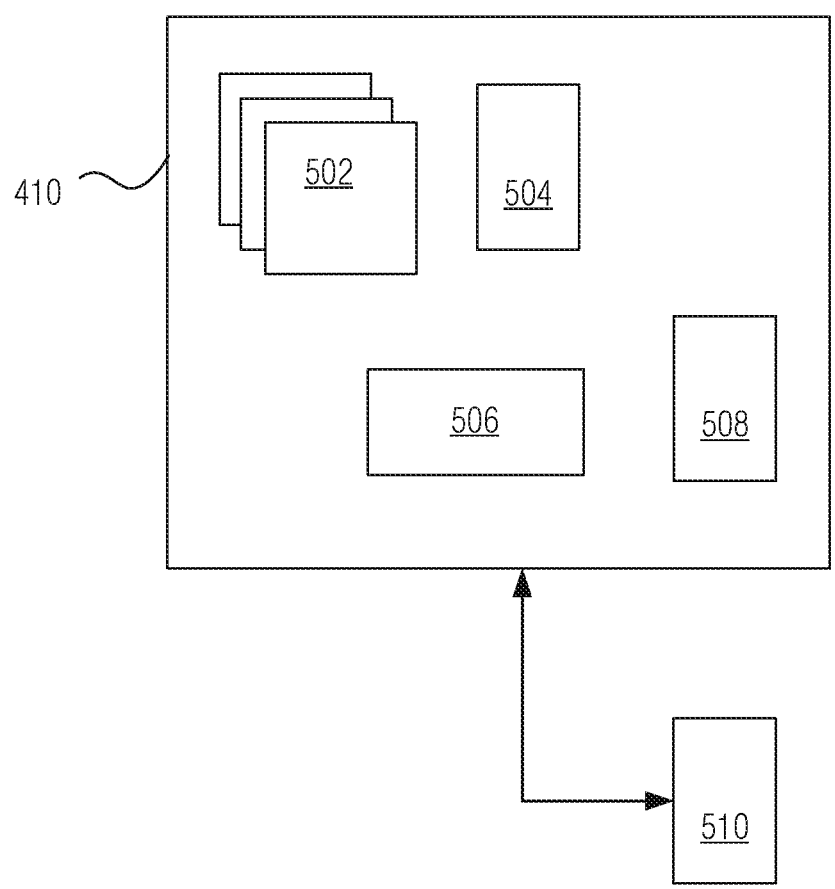
FIG. 5 is a block diagram illustrating example components of a CPU as one of the processing devices depicted in FIG. 4, according to various embodiments.

FIG. 5 is a block diagram illustrating example components of CPU 410 according to various embodiments. As depicted, CPU 410 includes one or more cores 502, cache 504, and CPU controller 506, which coordinates interoperation and tasking of the core(s) 502, as well as providing an interface to facilitate data flow between the various internal components of CPU 410, and with external components such as a memory bus or system interconnect.

CPU 410 includes non-volatile memory 508 (e.g., flash, EEPROM, etc.) for storing certain portions of foundational code, such as initialization code, authentication conversion (AC) code, and microcode. Also, CPU 410 may be interfaced with an external (e.g., formed on a separate IC)

non-volatile memory device 510 that stores foundational code that is launched by the initialization code, such as system BIOS or UEFI code.

In one aspect of the invention, CNN 120 and CNN 170 are configurable in a training mode, and a feature-vector-generation mode. According to an embodiment, the training and feature-vector-generation modes have different CNN architectures.

Figure 6:
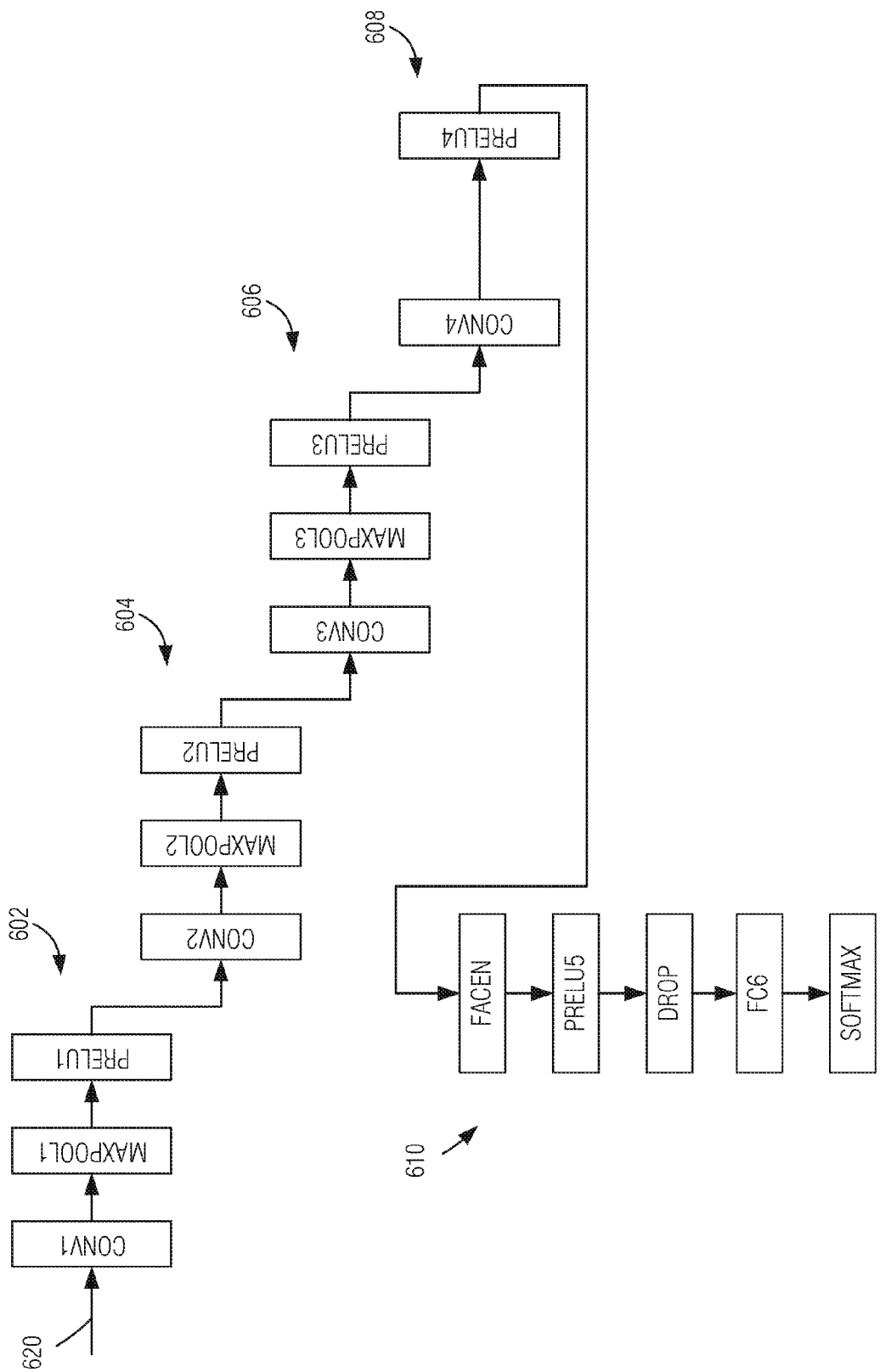
FIG. 6 is a diagram illustrating an example architecture of a convolutional neural network in its training mode according to an embodiment.
Figure 7:
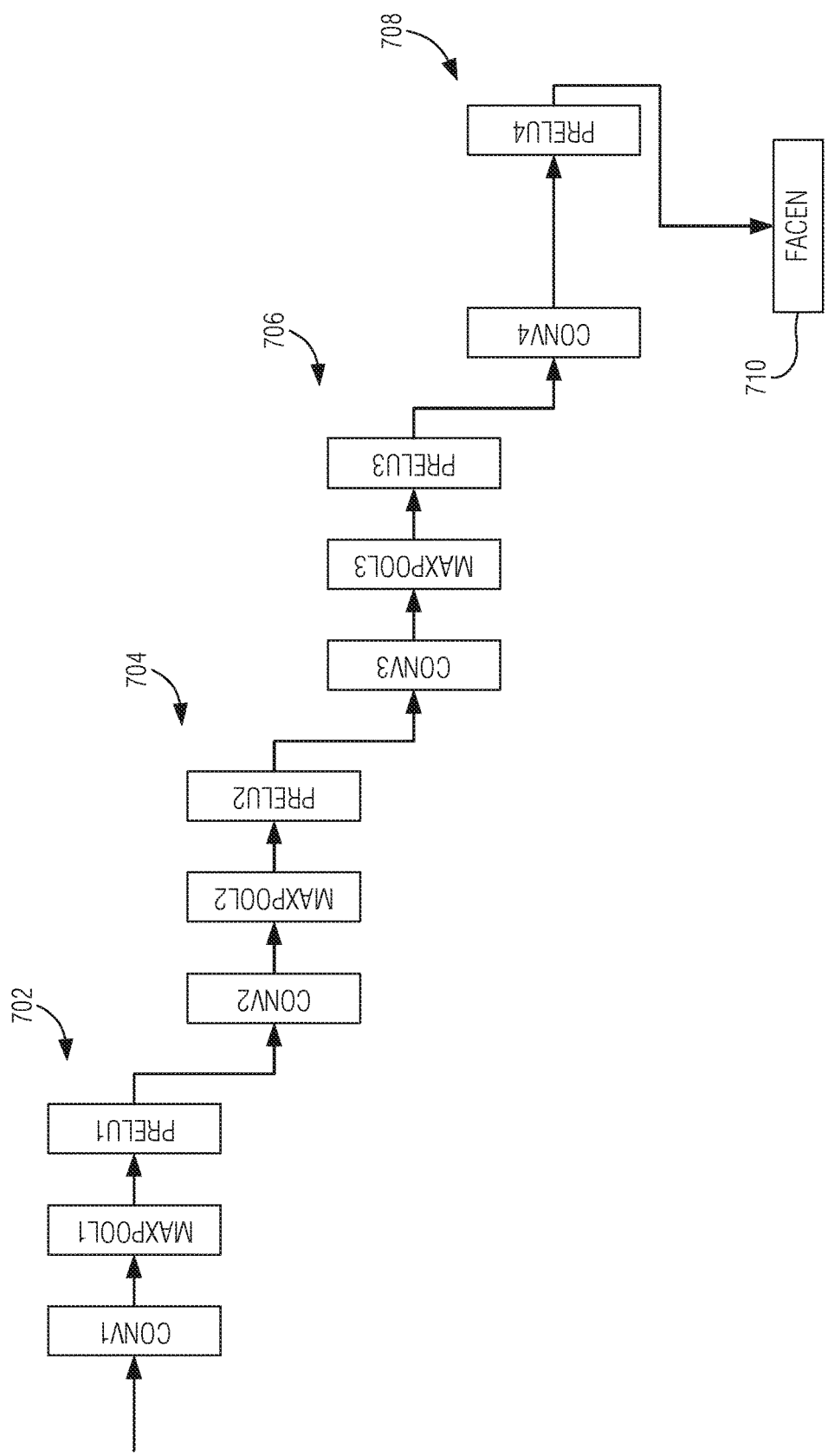
FIG. 7 is a diagram illustrating an example architecture of a convolutional neural network in its feature-vector-generation mode according to an embodiment.

FIG. 6 is a diagram illustrating an example architecture of CNN 120 or CNN 170 in its respective training mode. FIG. 7 is a diagram illustrating an example architecture of CNN 120 or CNN 170 in its respective feature-vector-generation mode. In the discussion that follows, the CNN architectures may include convolutional layers, non-linear (e.g., activation function) layers, pooling layers, fully-connected layers, a regularization layer, and a loss layer. Each of these layers is generally known in the art, and will be understood by persons skilled in the relevant technology; therefore, an exhaustive description of each layer is not repeated here. Principles of operation of the various layers may be found, for example, in Dingjun Yu et al., Mixed Pooling for Convolutional Neural Networks, RSKT 2014, LNAI 8818, at 364-375 (2014); Yi sun et al., Deep Learning Face Representation from Predicting 10,000 Classes, In Proceedings of the IEEE Conference on Computer Vision and Pattern Recognition, at 1891-1898 (2014); Xiang Wu, Learning Robust Deep Face Representation, arXiv preprint arXiv:1507.04844 (2015); and Hinton, G. E. et al., Improving neural networks by preventing co-adaptation of feature detectors, arXiv preprint arXiv:1207.0580 (2012); each of which is incorporated by reference herein.

According to some embodiments, the convolution layers include banks of filters with W parameters structured into a 3-dimensional dimensionality tensor K, W, H. Each filter is applied to the layer input independently using a two-dimensional convolution formula as follows:

$$o[m,n]=f[m,n]*g[m,n]=\sum_{u=-\infty}^{\infty}\sum_{v=-\infty}^{\infty}f[u,v]g[m-u,n-v].$$

In this example, the result of the application of the kth filter to the input may be computed using the following formula:

$$h_{ij}^{k}=\max\{0,(W^{k}*x)_{ij}+b_{k}\}.$$

In some embodiments, the non-linear layers are configured to apply a parametric rectified linear unit (PReLU) activation function defined as follows:

$$f(x) = \begin{cases} \alpha x, & x < 0 \\ x, & x \geq 0 \end{cases}.$$

In some embodiments, the pooling layers are configured to apply a max-pooling operation to reduce the spatial dimensionality in accordance with the following formula:

$$m_{jk}=\max\{(m-1)_{jk},(m-1)_{j-1,k},(m-1)_{j,k-1},(m-1)_{j-1,k-1}\}.$$

In some embodiments, the fully-connected layers perform high-level reasoning with neurons in a fully connected layer having full connections to all activations in the previous layer. Their activations are computed with a matrix multiplication followed by a bias offset according to the formula:

$$fc_i=(W^i \cdot x)+b_i$$

representing the result of the vector product of the output of the previous layer and of the W parameters matrix.

In some embodiments, a regularization layer utilizes a dropout operation, which stochastically sets half the activations in a hidden layer to zeros for each training sample. By doing this, the hidden units cannot co-adapt to each other, and they learn a better representation for the input in order to generalize well. An example of a dropout operation is described in Hinton et al., supra.

In some embodiments, the loss layer is implemented as a softmax (with loss) function for predicting a single class of K mutually exclusive classes.

Turning to FIG. 6, an example training-mode CNN architecture is shown. In an embodiment, this indexing and training-mode architecture is utilized in ANN 120 (FIG. 1A). The architecture includes four groups of convolution-maxpooling-PReLU layers indicated at 602, 604, 606, and 608. Input 620 feeds into convolution layer CONV1. In one example, input 620 contains a normalized (e.g., cropped, resized, etc.) image of a face that is produced following face detection. The image may be in a bitmap format with 3 channels (e.g. red, green, blue). Layer CONV1 convolves a first filter with the image to produce a layer output with 256 channels. Layer MAXPOOL1 produces a size-reduced output that is approximately a quarter the size of the input that CONV1 receives.

Following application of activation function PRELU1, convolution layer CONV2 applies a filter to produce an output with 768 channels. Layer MAXPOOL2 reduces the output of the CONV2 layer to approximately a quarter of its initial size, and feeds the output to PRELU2.

Convolution layer CONV3 receives the output from PRELU2, and applies a filter to produce 1536 channels. Layer MAXPOOL3 reduces the output size by approximately a factor of 4. Activation function PRELU3 is then applied as shown. Its output is fed to convolution layer CONV4, which applies a filter to produce an output of size 3072, to be processed by PRELU4.

The output of PRELU4 is provided to a group of layers 610, in which fully-connected layer FACEN produces an output of a feature vector having a size of 160 values. This operation is followed by layer PRELU5, and dropout operation DROP. Fully connected layer FC6 produces a feature vector with a size 198,397. Finally, the SOFTMAX layer is applied.

For training purposes, a backward propagation of errors, "backpropagation," technique is used. The loss function is defined by the following expression:

$$L(w) = \frac{1}{N}\sum_{n=1}^{N}[y_n\log\widehat{y_n} + (1-y_n)\log(1-\widehat{y_n})].$$

In an example embodiment, the input to layer CONV1 is an image that is 80×80 pixels, with three channels. Layer CONV1 applies a 4×4 filter with a stride of 1 to the input to produce an output that is 77×77 pixels, with 256 channels. MAXPOOL1 applies a filter that is 2×2 with a stride of 2 to produce an output that is 39×39 pixels and a channel quantity of 256. Convolution layer CONV2 applies a filter of size 3×3 and a stride of 1 to produce an output that is 37×37 pixels with 768 channels. MAXPOOL2 applies a filter that is 2×2 with a stride of 2 to produce an output that is 19×19 pixels with 768 channels. Convolution layer CONV3 applies a filter that is 3×3 with a stride of 1 to produce an output that is 17×17 pixels with 1536 channels. MAXPOOL3 applies a 2×2 filter with a stride of 2 to produce an output that is 9×9 pixels with 3072 channels. Convolution layer CONV4 applies a 2×2 filter with a stride of 1 to produce an output that is 8×8 pixels with 3072 channels.

The fully connected layer FACEN produces a 160-element feature vector. The 160-element feature vector is represented as feature vector 125 (FIG. 1A) and is stored in searchable database 135, for example, as a search index.

The remaining layers are used in the training of the CNN. Fully connected layer FC6 produces an output that is 198, 397 in size.

In a related embodiment, training results obtained from the training of CNN 120 (e.g., filters used in the convolutional layers) are applied to CNN 170.

FIG. 7 depicts a CNN architecture for the feature-vector-generation mode according to an embodiment. Groups of convolutional/max pooling/PReLU1 layers 702, 704, 706, and 708 are structured essentially in the same manner as groups 602, 604, 606, and 608 described above with reference to FIG. 6. The architecture for the feature-vector-generation mode differs in that following the PRELU4 layer, a fully connected layer FACEN at 710 is applied to produce a feature vector having a size of 160 values. In a related embodiment, this CNN architecture is employed as CNN 170 (FIG. 1B). In another related embodiment, the architecture of FIG. 7 omits training of the CNN.

ADDITIONAL NOTES AND EXAMPLES

Example 1 is a system for performing automated facial recognition, the system comprising: execution hardware including at least one processor core, a data store, and input/output facilities, the execution hardware configured to implement a convolutional neural network including: a first group of layers configured to accept as its input an image containing a face, the image having a plurality of input channels and an input pixel quantity, wherein the first group includes a first convolution layer, a first max-pooling layer, and a first parametric rectified linear unit activation function, and wherein the first group is configured to produce an output having a first predefined quantity of channels that is greater than the plurality of input channels by a factor of at least 80, and having and a pixel quantity that is more than 4.2 times smaller than the input pixel quantity; a second group of layers configured to accept as its input the output of the first group of layers, the second group including a second convolution layer, a second max-pooling layer, and a second parametric rectified linear unit activation function, wherein the second group is configured to produce an output having a second predefined quantity of channels that is greater than the first predefined quantity of channels by a factor of at least 3, and having and a pixel quantity that is more than 4.2 times smaller than the pixel quantity of the output of the first group of layers; a third group of layers configured to accept as its input the output of the second group of layers, the third group including a third convolution layer, a third max-pooling layer, and a third parametric rectified linear unit activation function, wherein the third group is configured to produce an output having a third predefined quantity of channels that is greater than the second predefined quantity of channels by a factor of at least 2, and having and a pixel quantity that is more than 3.5 times smaller than the pixel quantity of the output of the second group of layers; and a fourth group of layers configured to accept as its input the output of the third group of layers, the fourth group including a fourth convolution layer, and a fourth parametric rectified linear unit activation function, wherein the fourth group is configured to produce an output having a fourth predefined quantity of channels that is greater than the third predefined quantity of channels by a factor of at least 2, and having and a pixel quantity that is more than 1.1 times smaller than the pixel quantity of the output of the third group.

In Example 2, the subject matter of Example 1 optionally includes wherein the convolutional neural network further comprises: a fifth group of layers including a first fully-connected layer that produces an output comprising a feature vector representative of the image; and wherein the system further comprises a searchable database containing the feature vector, along with a plurality of other feature vectors respectively representing other images containing faces.

In Example 3, the subject matter of Example 2 optionally includes a search index builder configured to create a search index of feature vectors contained in the searchable database.

In Example 4, the subject matter of any one or more of Examples 2-3 optionally include a search engine configured to form a query in the searchable database for a subject feature vector; and a comparator configured to produce a measure of similarity between the subject feature vector and at least one reference feature vector returned as a result of the query, and to compare the measure of similarity against a similarity criterion, wherein satisfaction of the similarity criterion is indicative of a recognition of a face.

In Example 5, the subject matter of any one or more of Examples 2-4 optionally include wherein the fifth group of layers includes a fifth parametric rectified linear unit activation function, a dropout operation, a second fully-connected layer, and a softmax layer.

In Example 6, the subject matter of any one or more of Examples 2-5 optionally include wherein the convolutional neural network is configurable in a training set building configuration, and in a face recognizer configuration, wherein the training set building configuration undergoes training and wherein the face recognizer configuration omits training.

In Example 7, the subject matter of Example 6 optionally includes wherein the training set building configuration of the convolutional neural network is used to generate reference feature vectors for the searchable database.

In Example 8, the subject matter of any one or more of Examples 1-7 optionally include wherein: the first convolution layer is configured to produce a 256-channel output; the second convolution layer is configured to produce a 768-channel output; the third convolution layer is configured to produce a 1536-channel output; and the fourth convolution layer is configured to produce a 3072-channel output.

In Example 9, the subject matter of any one or more of Examples 1-8 optionally include wherein the input to the first group of layers includes an image cropped around the face.

In Example 10, the subject matter of any one or more of Examples 1-9 optionally include wherein: the first convolution layer is configured to apply a 4×4 filter with a stride of 1 to produce an output of 77×77 pixels with 256 channels; the first max-pooling layer is configured to apply a filter that is 2×2 with a stride of 2 to produce an output of 39×39 pixels with 256 channels; the second convolution layer is configured to apply a filter of size 3×3 and a stride of 1 to produce an output that is 37×37 pixels with 768 channels; the second max-pooling layer is configured to apply a filter that is 2×2 with a stride of 2 to produce an output of 19×19 pixels with 768 channels; the third convolution layer is configured to apply a filter that is 3×3 with a stride of 1 to produce an output that is 17×17 pixels with 1536 channels; the third max-pooling layer is configured to apply a 2×2 filter with a stride of 2 to produce an output of 9×9 pixels with 3072 channels; and the fourth convolution layer is configured to apply a 2×2 filter with a stride of 1 to produce an output that is 8×8 pixels with 3072 channels.

In Example 11, the subject matter of any one or more of Examples 1-10 optionally include a face detector configured to analyze a captured image for a presence of visual features indicative of a face, and to produce an output that is fed to an input of the convolutional neural network as the image containing the face.

Example 12 is a machine-implemented method for performing automated facial recognition, the method comprising: receiving, by a computing platform, an image containing a face, the image having a plurality of channels and an input pixel quantity; processing the image by a first group of layers of a convolutional neural network, including a convolution layer, a max-pooling layer, and a parametric rectified linear unit activation function layer, executed on the computing platform, to produce a first layer output having a first predefined quantity of channels that is greater than the plurality of input channels by a factor of at least 80, and having and a pixel quantity that is more than 4.2 times smaller than the input pixel quantity; processing first layer output by a second group of layers of the convolutional neural network, including a convolution layer, a max-pooling layer, and a parametric rectified linear unit activation function layer, executed on the computing platform, to produce a second layer output having a second predefined quantity of channels that is greater than the first predefined quantity of channels by a factor of at least 3, and having and a pixel quantity that is more than 4.2 times smaller than the pixel quantity of the first layer output; processing the second layer output by a third group of layers of the convolutional neural network, including a convolution layer, a max-pooling layer, and a parametric rectified linear unit activation function layer, executed on the computing platform, to produce a third layer output having a third predefined quantity of channels that is greater than the second predefined quantity of channels by a factor of at least 2, and having and a pixel quantity that is more than 3.5 times smaller than the pixel quantity of the second layer output; and processing the third layer output by a fourth group of layers of the convolutional neural network, including a convolution layer and a parametric rectified linear unit activation function layer, to produce a fourth layer output having a fourth predefined quantity of channels that is greater than the third predefined quantity of channels by a factor of at least 2, and having and a pixel quantity that is more than 1.1 times smaller than the pixel quantity of the third layer output.

In Example 13, the subject matter of Example 12 optionally includes processing the fourth layer output by a fifth group of layers including a first fully-connected layer, that produces an output comprising a feature vector representative of the image; and storing the feature vector in a searchable database containing a plurality of other feature vectors respectively representing other images containing faces.

In Example 14, the subject matter of Example 13 optionally includes forming a query for execution in the searchable database for a subject feature vector; and producing a measure of similarity between the subject feature vector and at least one reference feature vector returned as a result of execution of the query; and comparing the measure of similarity against a similarity criterion, wherein satisfaction of the similarity criterion is indicative of a recognition of a face.

In Example 15, the subject matter of any one or more of Examples 13-14 optionally include wherein the fifth group of layers includes a fifth parametric rectified linear unit activation function, a dropout operation, a second fully-connected layer, and a softmax layer.

In Example 16, the subject matter of any one or more of Examples 13-15 optionally include wherein the convolutional neural network is configurable in a training set building configuration, and in a face recognizer configuration, wherein the training set building configuration undergoes training and wherein the face recognizer configuration omits training.

Example 17 is a non-transitory machine-readable medium comprising instructions that, when executed on a computing platform, cause the computing platform to execute operations for performing automated facial recognition, the operations comprising: receiving, by a computing platform, an image containing a face, the image having a plurality of channels and an input pixel quantity; processing the image by a first group of layers of a convolutional neural network, including a convolution layer, a max-pooling layer, and a parametric rectified linear unit activation function layer, executed on the computing platform, to produce a first layer output having a first predefined quantity of channels that is greater than the plurality of input channels by a factor of at least 80, and having and a pixel quantity that is more than 4.2 times smaller than the input pixel quantity; processing first layer output by a second group of layers of the convolutional neural network, including a convolution layer, a max-pooling layer, and a parametric rectified linear unit activation function layer, executed on the computing platform, to produce a second layer output having a second predefined quantity of channels that is greater than the first predefined quantity of channels by a factor of at least 3, and having and a pixel quantity that is more than 4.2 times smaller than the pixel quantity of the first layer output; processing the second layer output by a third group of layers of the convolutional neural network, including a convolution layer, a max-pooling layer, and a parametric rectified linear unit activation function layer, executed on the computing platform, to produce a third layer output having a third predefined quantity of channels that is greater than the second predefined quantity of channels by a factor of at least 2, and having and a pixel quantity that is more than 3.5 times smaller than the pixel quantity of the second layer output; and processing the third layer output by a fourth group of layers of the convolutional neural network, including a convolution layer and a parametric rectified linear unit activation function layer, to produce a fourth layer output having a fourth predefined quantity of channels that is greater than the third predefined quantity of channels by a factor of at least 2, and having and a pixel quantity that is more than 1.1 times smaller than the pixel quantity of the third layer output.

In Example 18, the subject matter of Example 17 optionally includes the operations further comprising: processing the fourth layer output by a fifth group of layers including a first fully-connected layer, that produces an output comprising a feature vector representative of the image; and storing the feature vector in a searchable database containing a plurality of other feature vectors respectively representing other images containing faces.

In Example 19, the subject matter of Example 18 optionally includes the operations further comprising: forming a query for execution in the searchable database for a subject feature vector; and producing a measure of similarity between the subject feature vector and at least one reference feature vector returned as a result of execution of the query; and comparing the measure of similarity against a similarity criterion, wherein satisfaction of the similarity criterion is indicative of a recognition of a face.

In Example 20, the subject matter of any one or more of Examples 18-19 optionally include wherein the fifth group of layers includes a fifth parametric rectified linear unit activation function, a dropout operation, a second fully-connected layer, and a softmax layer.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the frill scope of equivalents to which such claims are entitled.

What is claimed is:

1. A system for performing automated facial recognition, the system comprising:

execution hardware including at least one processor core, a data store, and input/output facilities, the execution hardware configured to implement a convolutional neural network including:

a first group of layers configured to accept as a first input an image containing a face, the image having a plurality of input channels and an input pixel quantity, wherein the first group includes a first convolution layer, a first max-pooling layer, and a first parametric rectified linear unit activation function, and wherein the first group is configured to produce an output having a first predefined quantity of channels that is greater than the plurality of input channels by a factor of at least 80, and having a pixel quantity that is more than 4.2 times smaller than the input pixel quantity;

a second group of layers configured to accept as a second input the output of the first group of layers, the second group including a second convolution layer, a second max-pooling layer, and a second parametric rectified linear unit activation function, wherein the second group is configured to produce an output having a second predefined quantity of channels that is greater than the first predefined quantity of channels by a factor of at least 3, and having a pixel quantity that is more than 4.2 times smaller than the pixel quantity of the output of the first group of layers;

a third group of layers configured to accept as a third input the output of the second group of layers, the third group including a third convolution layer, a third max-pooling layer, and a third parametric rectified linear unit activation function, wherein the third group is configured to produce an output having a third predefined quantity of channels that is greater than the second predefined quantity of channels by a factor of at least 2, and having a pixel quantity that is more than 3.5 times smaller than the pixel quantity of the output of the second group of layers; and a fourth group of layers configured to accept as a fourth input the output of the third group of layers, the fourth group including a fourth convolution layer, and a fourth parametric rectified linear unit activation function, wherein the fourth group is configured to produce an output having a fourth predefined quantity of channels that is greater than the third predefined quantity of channels by a factor of at least 2, and having a pixel quantity that is more than 1.1 times smaller than the pixel quantity of the output of the third group;

a fifth group of layers including a first fully-connected layer that produces an output comprising a feature vector representative of the image; and wherein the system further comprises a searchable database containing the feature vector, along with a plurality of other feature vectors respectively representing other images containing faces.

2. The system of claim 1, further comprising:
a search index builder configured to create a search index of feature vectors contained in the searchable database.

3. The system of claim 1, further comprising:
a search engine configured to form a query in the searchable database for a subject feature vector; and a comparator configured to produce a measure of similarity between the subject feature vector and at least one reference feature vector returned as a result of the query, and to compare the measure of similarity against a similarity criterion, wherein satisfaction of the similarity criterion is indicative of a recognition of a face.

4. The system of claim 1, wherein the fifth group of layers includes a fifth parametric rectified linear unit activation function, a dropout operation, a second fully-connected layer, and a softmax layer.

5. The system of claim 1, wherein the convolutional neural network is configurable in a training set building configuration, and in a face recognizer configuration, wherein the training set building configuration undergoes training and wherein the face recognizer configuration omits training.

6. The system of claim 5, wherein the training set building configuration of the convolutional neural network is used to generate reference feature vectors for the searchable database.

7. The system of claim 1, wherein:
the first convolution layer is configured to produce a 256-channel output;
the second convolution layer is configured to produce a 768-channel output;
the third convolution layer is configured to produce a 1536-channel output; and
the fourth convolution layer is configured to produce a 3072-channel output.

8. The system of claim 1, wherein the input to the first group of layers includes an image cropped around the face.

9. The system of claim 1, wherein:
the first convolution layer is configured to apply a 4×4 filter with a stride of 1 to produce an output of 77×77 pixels with 256 channels;
the first max-pooling layer is configured to apply a filter that is 2×2 with a stride of 2 to produce an output of 39×39 pixels with 256 channels;
the second convolution layer is configured to apply a filter of size 3×3 and a stride of 1 to produce an output that is 37×37 pixels with 768 channels;
the second max-pooling layer is configured to apply a filter that is 2×2 with a stride of 2 to produce an output of 19×19 pixels with 768 channels;
the third convolution layer is configured to apply a filter that is 3×3 with a stride of 1 to produce an output that is 17×17 pixels with 1536 channels;
the third max-pooling layer is configured to apply a 2×2 filter with a stride of 2 to produce an output of 9×9 pixels with 3072 channels; and
the fourth convolution layer is configured to apply a 2×2 filter with a stride of 1 to produce an output that is 8×8 pixels with 3072 channels.

10. The system of claim 1, further comprising:
a face detector configured to analyze a captured image for a presence of visual features indicative of a face, and to produce an output that is fed to an input of the convolutional neural network as the image containing the face.

11. A machine-implemented method for performing automated facial recognition, the method comprising:
receiving, by a computing platform, an image containing a face, the image having a plurality of channels and an input pixel quantity;
processing the image by a first group of layers of a convolutional neural network, including a convolution layer, a max-pooling layer, and a parametric rectified linear unit activation function layer, executed on the computing platform, to produce a first layer output having a first predefined quantity of channels that is greater than the plurality of input channels by a factor of at least 80, and having a pixel quantity that is more than 4.2 times smaller than the input pixel quantity;
processing the first layer output by a second group of layers of the convolutional neural network, including a convolution layer, a max-pooling layer, and a parametric rectified linear unit activation function layer, executed on the computing platform, to produce a second layer output having a second predefined quantity of channels that is greater than the first predefined quantity of channels by a factor of at least 3, and having a pixel quantity that is more than 4.2 times smaller than the pixel quantity of the first layer output;
processing the second layer output by a third group of layers of the convolutional neural network, including a convolution layer, a max-pooling layer, and a parametric rectified linear unit activation function layer, executed on the computing platform, to produce a third layer output having a third predefined quantity of channels that is greater than the second predefined quantity of channels by a factor of at least 2, and having a pixel quantity that is more than 3.5 times smaller than the pixel quantity of the second layer output;
processing the third layer output by a fourth group of layers of the convolutional neural network, including a convolution layer and a parametric rectified linear unit activation function layer, to produce a fourth layer output having a fourth predefined quantity of channels that is greater than the third predefined quantity of channels by a factor of at least 2, and having a pixel quantity that is more than 1.1 times smaller than the pixel quantity of the third layer output;
processing the fourth layer output by a fifth group of layers including a first fully-connected layer, that produces an output comprising a feature vector representative of the image; and
storing the feature vector in a searchable database containing a plurality of other feature vectors respectively representing other images containing faces.

12. The method of claim 11, further comprising:
forming a query for execution in in the searchable database for a subject feature vector; and
producing a measure of similarity between the subject feature vector and at least one reference feature vector returned as a result of execution of the query; and
comparing the measure of similarity against a similarity criterion, wherein satisfaction of the similarity criterion is indicative of a recognition of a face.

13. The method of claim 11, wherein the fifth group of layers includes a fifth parametric rectified linear unit activation function, a dropout operation, a second fully-connected layer, and a softmax layer.

14. The method of claim 11, wherein the convolutional neural network is configurable in a training set building configuration, and in a face recognizer configuration, wherein the training set building configuration undergoes training and wherein the face recognizer configuration omits training.

15. A non-transitory machine-readable medium comprising instructions that, when executed on a computing platform, cause the computing platform to execute operations for performing automated facial recognition, the operations comprising:

receiving, by a computing platform, an image containing a face, the image having a plurality of channels and an input pixel quantity;

processing the image by a first group of layers of a convolutional neural network, including a convolution layer, a max-pooling layer, and a parametric rectified linear unit activation function layer, executed on the computing platform, to produce a first layer output having a first predefined quantity of channels that is greater than the plurality of input channels by a factor of at least 80, and having a pixel quantity that is more than 4.2 times smaller than the input pixel quantity;

processing the first layer output by a second group of layers of the convolutional neural network, including a convolution layer, a max-pooling layer, and a parametric rectified linear unit activation function layer, executed on the computing platform, to produce a second layer output having a second predefined quantity of channels that is greater than the first predefined quantity of channels by a factor of at least 3, and having a pixel quantity that is more than 4.2 times smaller than the pixel quantity of the first layer output;

processing the second layer output by a third group of layers of the convolutional neural network, including a convolution layer, a max-pooling layer, and a parametric rectified linear unit activation function layer, executed on the computing platform, to produce a third layer output having a third predefined quantity of channels that is greater than the second predefined quantity of channels by a factor of at least 2, and having a pixel quantity that is more than 3.5 times smaller than the pixel quantity of the second layer output;

processing the third layer output by a fourth group of layers of the convolutional neural network, including a convolution layer and a parametric rectified linear unit activation function layer, to produce a fourth layer output having a fourth predefined quantity of channels that is greater than the third predefined quantity of channels by a factor of at least 2, and having a pixel quantity that is more than 1.1 times smaller than the pixel quantity of the third layer output;

processing the fourth layer output by a fifth group of layers including a first fully-connected layer, that produces an output comprising a feature vector representative of the image; and storing the feature vector in a searchable database containing a plurality of other feature vectors respectively representing other images containing faces.

16. The non-transitory machine-readable medium of claim 15, the operations further comprising:

forming a query for execution in in the searchable database for a subject feature vector; and producing a measure of similarity between the subject feature vector and at least one reference feature vector returned as a result of execution of the query; and comparing the measure of similarity against a similarity criterion, wherein satisfaction of the similarity criterion is indicative of a recognition of a face.

17. The non-transitory machine-readable medium of claim 15, wherein the fifth group of layers includes a fifth parametric rectified linear unit activation function, a dropout operation, a second fully-connected layer, and a softmax layer.

* * * * *

UNITED STATES PATENT AND TRADEMARK OFFICE
CERTIFICATE OF CORRECTION

PATENT NO. : 10,083,347 B2
APPLICATION NO. : 15/224289
DATED : September 25, 2018
INVENTOR(S) : Kuharenko et al.

Page 1 of 1

It is certified that error appears in the above-identified patent and that said Letters Patent is hereby corrected as shown below:

On the Title Page

On page 2, in Column 2, item (56) under "Other Publications", Line 7, after "with", insert --robust--

On page 2, in Column 2, item (56) under "Other Publications", Line 10, delete ""DeepID-Net:" and insert --"Deep ID-Net:-- therefor In the Claims In Column 17, Lines 37-38, in Claim 9, delete "39 ×39" and insert --39×39-- therefor In Column 18, Line 45, in Claim 12, delete "in in" and insert --in-- therefor In Column 20, Line 19, in Claim 16, delete "in in" and insert --in-- therefor Signed and Sealed this
Eleventh Day of June, 2019

Andrei Iancu
*Director of the United States Patent and Trademark Office*